US012726863B2

(12) United States Patent
Xiong et al.

(10) Patent No.: US 12,726,863 B2
(45) Date of Patent: Sep. 1, 2026

(54) CONNECTION ESTABLISHMENT METHOD AND APPARATUS, AND COMMUNICATION DEVICE AND STORAGE MEDIUM

(71) Applicant: Beijing Xiaomi Mobile Software Co., Ltd., Beijing (CN)

(72) Inventors: Yi Xiong, Beijing (CN); Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 593 days.

(21) Appl. No.: 18/249,437

(22) PCT Filed: Oct. 20, 2020

(86) PCT No.: PCT/CN2020/122260

§ 371 (c)(1),
(2) Date: Apr. 18, 2023

(87) PCT Pub. No.: WO2022/082451

PCT Pub. Date: Apr. 28, 2022

(65) Prior Publication Data

US 2023/0388876 A1 Nov. 30, 2023

(51) Int. Cl.
*H04W 36/00* (2009.01)

(52) U.S. Cl.
CPC ............................ *H04W 36/00837* (2018.08)

(58) Field of Classification Search
CPC ....... H04W 36/00837; H04W 28/0268; H04W 76/10; H04W 84/06; H04W 48/16; H04B 7/18513

See application file for complete search history.

(56) References Cited

U.S. PATENT DOCUMENTS

| | | | | |
|---|---|---|---|---|
| 2016/0309518 A1 | 10/2016 | Patel et al. | | |
| 2018/0049222 A1 | 2/2018 | Manolakos et al. | | |
| 2021/0360383 A1* | 11/2021 | Kwan | .................. | H04W 12/35 |
| 2022/0070752 A1* | 3/2022 | Kim | ...................... | H04W 24/08 |

FOREIGN PATENT DOCUMENTS

| | | | |
|---|---|---|---|
| CN | 103929823 | A | 7/2014 |
| JP | 2011019074 | A | 1/2011 |
| KR | 20070006653 | A | 1/2007 |
| WO | WO 2018031267 | A1 | 2/2018 |
| WO | WO 2020149650 | A1 | 7/2020 |

(Continued)

OTHER PUBLICATIONS

Extended European Search Report issued in Application No. 20958034.9 dated Jun. 25, 2024, 8 pages.

(Continued)

*Primary Examiner* — Rafael Pérez-Gutiérrez

*Assistant Examiner* — Gilbert M. Grant

(74) *Attorney, Agent, or Firm* — Finnegan, Henderson, Farabow, Garrett & Dunner, L.L.P.

(57) ABSTRACT

A method for establishing a connection is performed by a user equipment (UE), and includes: determining a connection waiting duration for the UE to connect to a target base station or target cell; and connecting to the target base station or target cell based on the connection waiting duration after a predetermined connection moment.

14 Claims, 6 Drawing Sheets

(56) References Cited

FOREIGN PATENT DOCUMENTS

WO WO 2020192752 A1 10/2020

OTHER PUBLICATIONS

Notice of Reasons for Refusal for Japanese Patent Application No. 2023-524207, dated May 7, 2024, 10 pages.
CATT, Huawei, HiSilicon, "TP on Feeder Link Switch", 3GPP TSG-RAN WG2 Meeting 108, R2-1916555, Revised of 1916386, Reno, USA, Nov. 18-22, 2019, 9 pages.
International Search Report and Written Opinion of International Application No. PCT/CN2020/122260, dated Jun. 24, 2021, 13 pages.
Office Action for Russia Application No. 2023112266/07, dated Dec. 27, 2023, 20 pages.
Examination report for India Application No. 202347034070, dated Mar. 15, 2024, 6 pages.
Fifth Office Action issued by China National Intellectual Property Administration on Oct. 16, 2024, in corresponding Application No. CN 202080002885.2, 13 pages.

* cited by examiner gNB2
GW2
switch threshold
GW1
gNB1
T1
gNB2
GW2
switch threshold
GW1
gNB1
T2

3000
3002
3004
memory
processing component
communication component
3016
3006
power component
3008
multimedia component
processor
3020
3014
sensor component
3010
audio component
I/O interface
3012

CONNECTION ESTABLISHMENT METHOD AND APPARATUS, AND COMMUNICATION DEVICE AND STORAGE MEDIUM

CROSS-REFERENCE TO RELATED APPLICATION

This application is the national phase of International Application No. PCT/CN2020/122260 filed on Oct. 20, 2020, the content of which is hereby incorporated by reference in its entirety.

TECHNICAL FIELD

The disclosure relates to, but is not limited to, the field of wireless communication technologies, and in particular, to a method and an apparatus for establishing a connection, a communication device, and a storage medium.

BACKGROUND

Non-Terrestrial Networks (NTN) are introduced into fifth generation (5G) cellular mobile communication systems. In the NTN system, a feeder link switch occurs as high-altitude platforms such as satellites move. Herein, a wireless link between a high-altitude platform such as a space-based mobile base station and a serving ground station such as a control network node (a satellite gateway, a core network, or the like) is called a feeder link. During the movement of the satellite, feeder links may be established with different control network nodes.

SUMMARY

According to a first aspect of the disclosure, a method for establishing a connection is provided. The method is performed by a user equipment (UE). The method includes: determining a connection waiting duration for the UE to connect to a target base station or target cell; and connecting to the target base station or target cell based on the connection waiting duration after a predetermined connection moment.

According to a second aspect of the disclosure, a method for establishing a connection is provided. The method is performed by a base station. The method includes: sending, to a UE, indication information for indicating a reference connection waiting duration, and/or indication information for indicating a predetermined connection moment.

According to a third aspect of the disclosure, a communication device is provided. The communication device includes a processor, and a memory storing a program executable by the processor. The processor is configured to execute the executable program to perform the method for establishing a connection as described in the first aspect or the second aspect.

According to a fourth aspect of embodiments of the disclosure, a non-transitory computer-readable storage medium is provided. The non-transitory computer-readable storage medium has stored therein instructions that, when executed by a processor of a communication device, cause the communication device to perform the method for establishing a connection as described in the first aspect or the second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with embodiments of the disclosure. Instead, they are merely examples of apparatuses and methods consistent with aspects related to embodiments of the disclosure as recited in the appended claims.

The terms used in embodiments of the disclosure are only for the purpose of describing specific embodiments, and are not intended to limit embodiments of the disclosure. The singular forms of "a", "said" and "the" used in embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in embodiments of the disclosure to describe various information, the information should not be limited to these terms. These terms are only used to distinguish the same type of information from each other. For example, without departing from the scope of the disclosure, the instruction information may also be referred to as the second information, and similarly, the second information may also be referred to as the instruction information. Depending on the context, the word "if" as used herein can be interpreted as "when", "while" or "in response to determining".

Figures 1, 2:
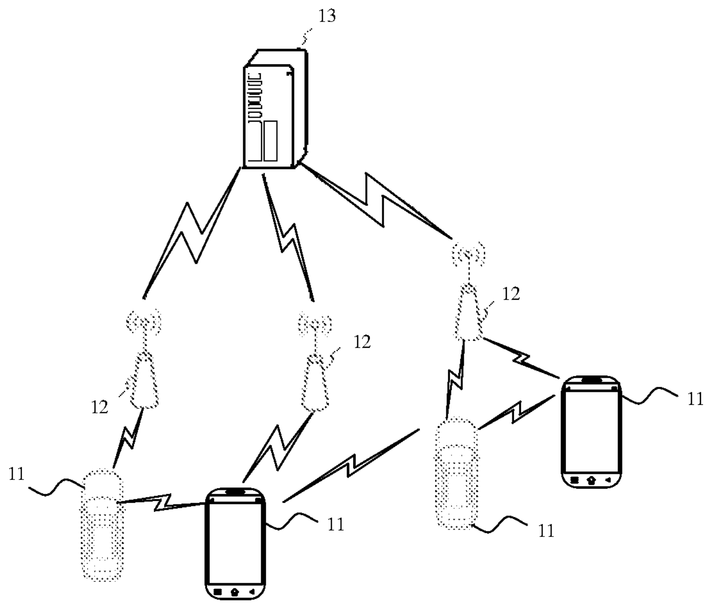
FIG. 1 is a schematic diagram of a wireless communication system according to some embodiments.
FIG. 2 is a schematic diagram illustrating a feeder link switch according to some embodiments.

FIG. 1 is a schematic diagram of a wireless communication system according to some embodiments. As illustrated in FIG. 1, the wireless communication system is a communication system based on cellular mobile communication technologies. The wireless communication system may include terminals 11 and base stations 12.

The terminal 11 may be a device that provides voice and/or data connectivity to a user. The terminal 11 can communicate with one or more core networks via a radio access network (RAN). The terminal 11 can be an Internet of Things (IoT) terminal such as a sensor device, a mobile phone (or a cellular phone) and a computer with the IoT terminal such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment (UE). Alternatively, the terminal 11 may also be an unmanned aircraft. Alternatively, the terminal 11 may also be an in-vehicle device, for example, a trip computer having a wireless communication function or a wireless communication device connected to the trip computer. Alternatively, the terminal 11 may also be a roadside device, for example, a street lamp, a signal lamp or other roadside device having the wireless communication function.

The base station 12 may be a network side device in the wireless communication system. The wireless communication system may be the fourth generation mobile communication (4G) system, also known as the long term evolution (LTE) system. The wireless communication system may also be the fifth generation mobile communication (5G) system, also known as the new radio (NR) system or 5G NR system. Alternatively, the wireless communication system may also be a next-generation system of the 5G system. The access network in the 5G system can be called the new generation-radio access network (NG-RAN). The wireless communication system may also be the machine-type communications (MTC) system.

The base station 12 may be an evolved base station (eNB) adopted in the 4G system. Alternatively, the base station 12 may also be a base station (gNB) adopting a centralized and distributed architecture in the 5G system. When the base station 12 adopts the centralized distributed architecture, it usually includes a central unit (CU) and at least two distributed units (DUs). The CU is provided with a packet data convergence protocol (PDCP) layer, a radio link control (RLC) layer and a protocol stack having a media access control (MAC) layer. The DU is provided with a protocol stack having a physical (PHY) layer. The embodiments of the disclosure do not limit the specific implementation manner of the base station 12.

A wireless connection can be established between the base station 12 and the terminal 11 through a wireless air interface. In different embodiments, the wireless air interface is a wireless air interface based on the 4G standard. Alternatively, the wireless air interface is a wireless air interface based on the 5G standard, for example, the wireless air interface is a NR. The wireless air interface can also be a wireless air interface based on a standard of next generation mobile communication network technology based on the 5G standard.

In some embodiments, an end to end (E2E) link may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the above wireless communication system may also include a network management device 13.

The base stations 12 are coupled to the network management device 13 respectively. The network management device 13 may be a core network device in the wireless communication system. For example, the network management device 13 may be a mobility management entity (MME) of an evolved packet core (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 13 is not limited in the embodiments of the disclosure.

The execution subjects involved in embodiments of the disclosure include, but are not limited to, a satellite that implements a non-terrestrial cellular mobile communication network coverage, a user equipment such as a mobile phone terminal that uses a cellular mobile communication network technology for wireless communication, and a base station.

An application scenario of embodiments of the disclosure is as follows. A feeder link switch of a low-earth orbit (LEO) satellite is illustrated in FIG. 2. During the movement of the LEO satellite under transparent transmissions, a feeder link established with gateway (GW)1 is switch to a feeder link established with GW2, in which GW1 is connected to base station 1 and GW2 is connected to base station 2. That is, During the movement of the LEO satellite, it switches from base station 1 to base station 2. If the satellite can only provide services through one feeder link at a time, when the LEO satellite moves, RRC connections of all UEs served by base station 1 through GW1 need to be disconnected. After the handover to base station 2 via GW2, each UE may be able to find a reference signal corresponding to base station 2 and access a cell belonging to base station 2.

There are two types of feeder link switch: hard switch and soft switch.

Figure 3:
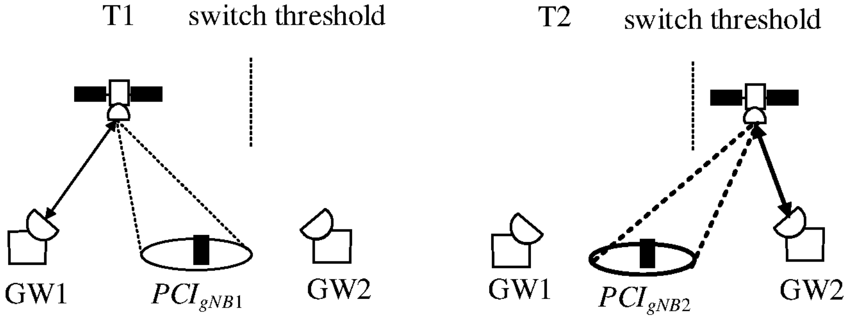
FIG. 3 is a schematic diagram illustrating a feeder link hard switch according to some embodiments.

The feeder link hard switch is illustrated in FIG. 3. When the LEO satellite under transparent transmissions performs the feeder link hard switch, that is, when only one feeder link connection through this satellite is available during the GW transition, a signal of a cell served by the LEO satellite is unavailable for a time period between a moment (time point) T1 when leaving the GW and a moment (time point) T2 when accessing the new GW. When the old GW and new GW correspond to different base stations, the UE needs to access a serving cell provided by the LEO satellite again.

Figure 4:
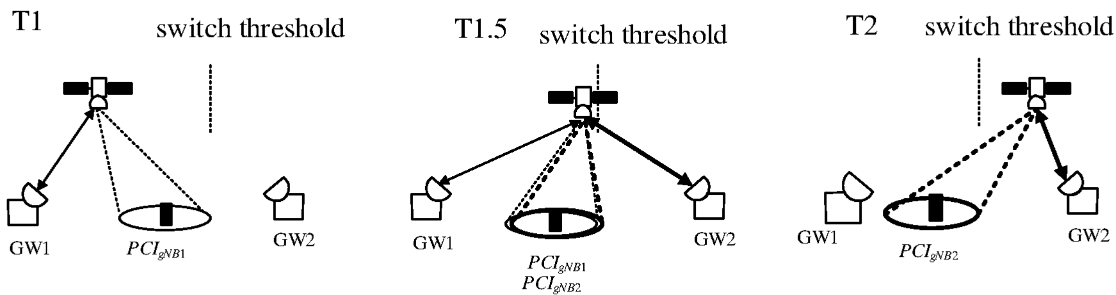
FIG. 4 is a schematic diagram illustrating a feeder link soft switch according to some embodiments.

The feeder link soft switch is illustrated in FIG. 4. When the LEO satellite under transparent transmissions performs the feeder link soft switch, that is, two feeder link connections through this satellite are available during the GW transition. During the GW transition, for a signal of a cell served by the LEO satellite for a time period between a moment (time point) T1 when leaving the GW and a moment (time point) T2 when accessing the new GW, both base station 1 and base station 2 can be available. The UE can switch the serving cell during the feeder link switch process.

Two possible solutions for establishing a connection between the UE and the base station are proposed for the feeder link switch.

Solution 1: the feeder link hard switch based on precise timing control.

Since there is no overlap between a source cell and a target cell for base stations located in the old GW and new GW, the switch can only be controlled according to the exact time. In the feeder link hard switch in FIG. 3, a handover (HO) command needs to be sent to all UEs served by the LEO satellite before T1, so a time-triggered conditional hand over (CHO) manner can be used. The UE can start a handover process after T2. Therefore, a handover trigger moment should be included in the handover command.

Solution 2: the feeder link hard switch based on conditional radio resource control (RRC) re-establishment.

Considering the large cell of NTN, it may be an extremely difficult problem to send a handover (HO) command to a large number of UEs in a short duration.

Some UEs may not be able to perform HO in time, so it may detect that the radio link fails, and then the UE starts the RRC re-establishment procedure. It takes a long duration to re-establish an RRC connection, and may involve radio link failure (RLF) detection, cell selection, and possible re-establishment failures, which may affect service continuity. Therefore, the network can provide auxiliary information, such as an ID of a target cell and/or re-establishment conditions. The auxiliary information can be separately sent to the UE through a system information block (SIB) instead of a dedicated signaling, thereby effectively reducing the signaling overhead caused by a large number of UEs.

For solution 1, considering that all UEs in the serving cell of the LEO satellite have the same target base station, the same handover target base station and trigger moment before time T1 may be sent to these UEs by means of broadcasting. This can effectively reduce the signaling overhead. However, this will cause a large number of UEs to perform handover at the same time, which will cause the network congestion. Similarly, for solution 2, when a large number of UEs detect that the radio link fails, starting RRC re-establishment may also face the network congestion.

Figure 5:
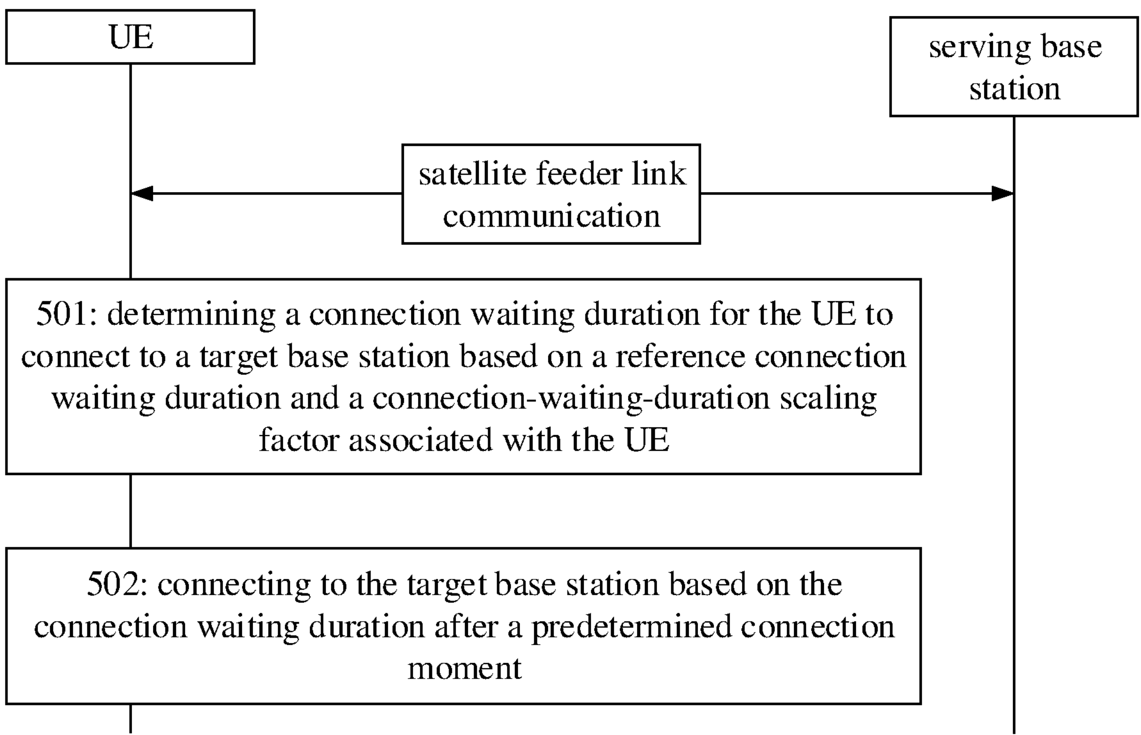
FIG. 5 is a schematic flowchart of a method for establishing a connection according to some embodiments.

As illustrated in FIG. 5, a method for establishing a connection is provided in some embodiments. The method for establishing a connection is applicable to a UE of wireless communication. The method includes the following.

Step 501: a connection waiting duration for the UE to connect to a target base station is determined based on a reference connection waiting duration and a connection-waiting-duration scaling factor associated with the UE.

Step 502: UE connects to the target base station based on the connection waiting duration after a predetermined connection moment.

The UE may be a mobile phone terminal or the like that uses a cellular mobile communication network technology to perform wireless communication. The UE can establish a communication connection with the serving base station through the transparent forwarding of the feeder link between the high-altitude platform such as the satellite and the satellite ground station such as the GW. Herein, the high-altitude platform is illustrated in Table 1.

TABLE 1

| platform | height range | orbit | typical beam footprint size |
|---|---|---|---|
| LEO satellite | 300-1500 km | circular earth orbit | 100-1000 km |
| medium-earth orbit (MEO) satellite | 7000-25000 km | | 100-1000 km |
| geostationary earth orbit (GEO) satellite | 35 786 km | notional station keeping position fixed in terms of | 200-3500 km |
| unmanned aircraft system (UAS) platform, such as high-altitude platform station | 8-50 km (HAPS 20m) | elevation/azimuth with respect to a given earth point | 5-200 km |
| high elliptical orbit (HEO) satellite | 400-50000 km | elliptical earth orbit | 200-3500 km |

In Table 1, except for GEO satellites, other high-altitude platforms usually have the feeder link switch. The method of embodiments of the disclosure can be used in, but not limited to, an NTN communication system where the feeder link switch occurs.

The following embodiments of the disclosure explain the method of embodiments of the disclosure by using the NTN communication system of the LEO satellite platform. However, it does not mean that the method in embodiments of the disclosure is only used in the NTN communication system of the LEO satellite platform.

As illustrated in FIG. 2, during the movement of the LEO satellite under transparent transmissions, the feeder link established with GW1 may switch to the feeder link established with GW2, in which GW1 is connected to base station 1 and GW2 is connected to the base station 2. That is, during the moving process of the LEO satellite, it may switch from base station 1 to base station 2. Herein, the base station may be a gNB in the 5G cellular mobile communication.

The target base station is a base station that the UE switches from the current serving base station during the movement of the LEO satellite. For example, as illustrated in FIG. 2, at the moment T1, gNB1 is connected to the UE through GW1 and the LEO satellite, and gNB1 is the serving base station of the UE. During the movement of the LEO satellite, that is, from the moment T1 to the moment T2, the base station connected to the UE is switched from gNB1 to gNB2 and gNB2 is the target base station.

The reference connection waiting duration can be a fixed duration. The reference connection waiting duration may be specified by a communication protocol or determined by a core network or base station based on the number of UEs covered by LEO satellite signals and/or the number of UEs that need to be connected to the target base station.

The connection-waiting-duration scaling factor can be used to adjust the connection waiting duration of the UE based on the reference connection waiting duration. The connection-waiting-duration scaling factor is associated with the UE and different UEs may have different connection-waiting-duration scaling factors. Herein, the connection-waiting-duration scaling factor may be associated with a UE type or may be associated with a current service characteristic of the UE or the like.

Based on the reference connection waiting duration and the connection-waiting-duration scaling factor associated with the UE, the connection waiting duration of each UE can be obtained. Due to different connection-waiting-duration scaling factors, the connection waiting duration of each UE is also different. For example, a product of the reference connection waiting duration and the connection-waitingduration scaling factor or a quotient of dividing the reference connection waiting duration and the connection-waiting-duration scaling factor can be determined as the connection waiting duration. When the division manner is adopted to determine the connection waiting duration, the connection-waiting-duration scaling factor is not 0. Herein, the connection-waiting-duration scaling factor may be a non-negative number less than or equal to 1 or a positive number greater than 1.

The predetermined connection moment may be a moment indicated by the serving base station to start to switch to the target base station, or may be a moment when the satellite establishes a connection with the target base station, or the like. As illustrated in FIG. 2, the predetermined connection moment may be the moment T2. The UE may connect to the target base station based on the predetermined connection moment and the connection waiting duration. For example, the target base station may be connected to after an interval of the connection waiting duration since the predetermined connection moment. Since the connection waiting duration of each UE is different, the moment at which each UE connects to the target base station is also different. In this way, the number of UEs connected to the target base station at the same time is reduced and the network congestion is relieved.

In this way, after the predetermined connection moment, the target base station is connected based on the connection waiting duration associated with each UE, the number of UEs connected to the target base station at the same time is reduced, and the network congestion is relieved.

In some embodiments, the method includes the following.

The connection-waiting-duration scaling factor corresponding to a service characteristic parameter associated with the UE, is determined based on a correspondence between service characteristic parameters and ranges of connection-waiting-duration scaling factors.

Herein, the service characteristic parameter may be a type parameter, a priority parameter, a rate parameter, and/or a transmission quality requirement parameter, etc. of data currently transmitted by the UE. For example, the service characteristic parameter may be a priority level in QoS. Different service characteristic parameters are associated with different ranges of connection-waiting-duration scaling factors.

The UE may determine the connection-waiting-duration scaling factor from the range of connection-waiting-duration scaling factors corresponding to its current service characteristic parameter. The UE may determine the connection-waiting-duration scaling factor based on a predetermined selection rule from the range of connection-waiting-duration scaling factors. For example, the predetermined selection rule may specify that the corresponding connection-waiting-duration scaling factor is selected from the range of connection-waiting-duration scaling factors based on a signal strength of the UE.

For example, the UE obtains a correspondence between connection-waiting-duration scaling factors and service characteristic parameters Access Identities through system broadcast. When Access Identity=1, the connection-waiting-duration scaling factor∈[Pl_1, Pu_1], where 0≤Pl_1≤Pu_1≤1. When Access Identity=2, the connection-waiting-duration scaling factor∈[Pl_2, Pu_2], where 0≤Pl_2≤Pu_2≤1, when Access Identity=11, 12, . . . , etc., it is set the same as above.

If Access Identity stored in the UE is 1, respectively, the range of connection-waiting-duration scaling factors corresponding to this UE is [Pl_1, Pu_1].

The UE may determine the connection-waiting-duration scaling factor from the range of [Pl_1, Pu_1].

In this way, UEs with different service characteristic parameters have different ranges of connection-waiting-duration scaling factors, and the obtained connection-waiting-duration scaling factors are different, so that different connection waiting durations can be determined. The UEs connect to the target base station based on different connection waiting durations, reducing the number of UEs connected to the target base station at the same time and relieving the network congestion.

In some embodiments, the correspondence between service characteristic parameters and ranges of connection-waiting-duration scaling factors includes: a correspondence between ranges of service characteristic parameters and ranges of connection-waiting-duration scaling factors.

Since there are a large number of possible values for the service characteristic parameter, the correspondence between ranges of service characteristic parameters and ranges of connection-waiting-duration scaling factors is established. The available values of the service characteristic parameter can be divided into multiple different ranges, and each range of service characteristic parameters corresponds to a range of connection-waiting-duration scaling factors. The ranges of connection-waiting-duration scaling factors corresponding to different ranges of service feature parameters may be the same or different.

The UE may determine the connection-waiting-duration scaling factor based on the correspondence between ranges of service characteristic parameters and ranges of connection-waiting-duration scaling factors.

For example, the service characteristic parameter may be a packet delay budget (PDB). All PDBs may be divided into N ranges, where N is a positive integer greater than or equal to 1. Each PDB range corresponds to a range of connection-waiting-duration scaling factors. The UE may select the PDB range corresponding to its own PDB, and then determine the corresponding range of connection-waiting-duration scaling factors.

For example, a sequence of PDBs is PDB-reference={PDBreference_1, . . . , PDBreference_n, . . . , PDBreference_N}, where 0<PDBreference_1<, . . . , <PDBreference_n<, . . . , <PDBreference_N. And the connection-waiting-duration scaling factor corresponding to each PDB is obtained and denoted as a sequence including connection-waiting-duration scaling factors as P={P_1, . . . , P_N}, where 0<P_1<, . . . , <P_n<, . . . , <P_N<1.

The UE obtains the PDB corresponding to the QoS flow according to the 5QI of the ongoing service.

If 0≤PDB≤PDBreference_1, the UE may determine the connection-waiting-duration scaling factor within the range [0, P_1] of connection-waiting-duration scaling factors. If PDBminreference_n−1<PDBmin≤PDBminreference_n, the UE may determine the connection-waiting-duration scaling factor within the range (P_n−1, P_n) of connection-waiting-duration scaling factors.

If PDBmin>PDUminreference_N, the UE may determine the connection-waiting-duration scaling factor within the range (P_n, 1] of connection-waiting-duration scaling factors.

In some embodiments, determining the connection-waiting-duration scaling factor corresponding to the service characteristic parameter associated with the UE, based on the correspondence between service characteristic parameters and ranges of connection-waiting-duration scaling factors includes the following.

The connection-waiting-duration scaling factor is determined from a range of connection-waiting-duration scaling factors corresponding to a range of service characteristic parameters to which the service characteristic parameter associated with the UE belongs.

For example, the service characteristic parameter may be a PDB and all PDBs may be divided into N ranges, where N is an integer positive number greater than or equal to 1. Each PDB range corresponds to a range of connection-waiting-duration scaling factors. The UE may select the PDB range to which its own PDB belongs, and determine the range of connection-waiting-duration scaling factors corresponding to the PDB range, and then determine the connection-waiting-duration scaling factor from the range of connection-waiting-duration scaling factors.

In some embodiments, determining the connection-waiting-duration scaling factor corresponding to the service characteristic parameter associated with the UE, based on the correspondence between service characteristic parameters and ranges of connection-waiting-duration scaling factors includes the following.

The connection-waiting-duration scaling factor is selected randomly from a range of connection-waiting-duration scaling factors corresponding to the service characteristic parameter associated with the UE.

Herein, the UE may randomly select a value from the determined range of connection-waiting-duration scaling factors as its connection-waiting-duration scaling factor.

For example, the UE may generate a random number rand within the range of connection-waiting-duration scaling factors, and the random number may be uniformly distributed within the range of connection-waiting-duration scaling factors. Based on the randomly generated connection-waiting-duration scaling factor and by combining the reference connection waiting duration, the connection waiting duration is determined.

In this way, by randomly selecting a value within the range of connection-waiting-duration scaling factors, the situation where the value is the same is reduced and the situation where the connection waiting duration is the same is reduced. The UEs connects to the target base station based on different connection waiting durations, reducing the number of UEs connected to the target base station at the same time and relieving the network congestion.

In some embodiments, the service characteristic parameter includes: an access identity, and/or an access category, and/or a fifth-generation quality of service identity (5QI), and/or a quality of service (QoS) characteristics parameter.

The 5G system should be able to use the relevant restriction parameters to limit the right of the UE to access the network. These restriction parameters are different according to the Access Identity and Access Category. The Access Identity is configured on the UE, as illustrated in Table 2. The Access Category is defined by a combination of UE-related conditions and access attempt types, as illustrated in Table 3.

TABLE 2

| Access Identity number | UE configuration |
|---|---|
| 0 | UE is not configured with any parameters from this table. |
| 1 | UE is configured for Multimedia Priority Service (MPS). |
| 2 | UE is configured for Mission Critical Service (MCS). |
| 3 | UE for which Disaster Condition applies. |
| 3-10 | Reserved for future use. |
| 11 | Access Class 11 is configured in the UE. |
| 12 | Access Class 12 is configured in the UE. |
| 13 | Access Class 13 is configured in the UE. |
| 14 | Access Class 14 is configured in the UE. |
| 15 | Access Class 15 is configured in the UE. |

TABLE 3

| Access Category number | Conditions related to UE | Type of access attempt |
|---|---|---|
| 0 | All | MO signaling resulting from paging |
| 1 | UE is configured for delay tolerant service and subject to access control for Access Category 1, which is judged based on relation of UE's HPLMN and the selected PLMN. | All except for Emergency, or MO exception data |
| 2 | All | Emergency |
| 3 | All except for the conditions in Access Category 1. | except for paging, MO signaling in NAS level |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8 | All except for the conditions in Access Category 1 | MO signaling on RRC level resulting from other than paging |
| 9 | All except for the conditions in Access Category 1 | MO IMS registration related signaling |
| 10 | All | MO exception data |
| 11-31 | | Reserved standardized Access Categories |
| 32-63 | All | Based on operator classification |

In the 5G system, the QoS model is based on the QoS flow, and the QoS flow is the Protocol Data Unit (PDU). The fine-grained QoS in PDU sessions distinguishes granularity, that is, the difference between two PDU sessions is that their QoS flows are different. In the 5G system, a QoS Flow Identifier (QFI) is used to identify a QoS flow, and QFI can be dynamically configured or equal to 5QI.

Standardized 5QI values are used to specify commonly used services and can be mapped with 5G QoS features. The mapping of standardized 5QI values to 5G QoS features is illustrated in Table 4.

TABLE 4

| 5QI Value | Resource Type | Default Priority Level | Packet Delay Budget | Packet Error Rate | Default Maximum Data Burst Volume | Default Averaging Window | Example Services |
|---|---|---|---|---|---|---|---|
| 1 | GBR | 20 | 100 ms | $10^{-2}$ | N/A | 2000 ms | Conversational Voice |
| 2 | | 40 | 150 ms | $10^{-3}$ | N/A | 2000 ms | Conversational Video, Live Streaming |
| 3 | | 30 | 50 ms | $10^{-3}$ | N/A | 2000 ms | Real Time Gaming, V2X messages (refer to TS 23.287 [121]) Electricity distribution-medium voltage, Process automation monitoring |
| 4 | | 50 | 300 ms | $10^{-6}$ | N/A | 2000 ms | Non-Conversational Video, Buffered Streaming |
| 65 | | 7 | 75 ms | $10^{-2}$ | N/A | 2000 ms | Mission Critical user plane Push To Talk voice (e.g., MCPTT) |
| 66 | | 20 | 100 ms | $10^{-2}$ | N/A | | Non-Mission-Critical user plane Push To Talk voice |
| 67 | | 15 | 100 ms | $10^{-3}$ | N/A | 2000 ms | Mission Critical Video user plane |
| 75 | | | | | | | |
| 71 | | 56 | 150 ms | $10^{-6}$ | N/A | 2000 ms | "Live" Uplink Streaming (such as TS 26.238 [76]) |
| 72 | | 56 | 300 ms | $10^{-4}$ | N/A | 2000 ms | "Live" Uplink Streaming (such as TS 26.238 [76]) |
| 73 | | 56 | 300 ms | $10^{-8}$ | N/A | 2000 ms | "Live" Uplink Streaming (such as TS 26.238 [76]) |
| 74 | | 56 | 500 ms | $10^{-8}$ | N/A | 2000 ms | "Live" Uplink Streaming (such as TS 26.238 [76]) |
| 76 | | 56 | 500 ms | $10^{-4}$ | N/A | 2000 ms | "Live" Uplink Streaming (such as TS 26.238 [76]) |
| 5 | | 10 | 100 ms | $10^{-6}$ | N/A | N/A | IMS Signaling) |
| 6 | Non-GBR | 60 | 300 ms | $10^{-6}$ | N/A | N/A | Video (Buffered Streaming) TCP-based such as www, e-mail, chat, ftp, p2p file sharing, progressive video, or the like |
| 7 | | 70 | 100 ms | $10^{-3}$ | N/A | N/A | Voice, Video (Live Streaming) Interactive Gaming |
| 8 | | 80 | 300 ms | $10^{-6}$ | N/A | N/A | Video (Buffered Streaming) |
| 9 | | 90 | | | | | TCP-based such as www, e-mail, chat, ftp, p2p file sharing, progressive video, or the like |
| 69 | | 5 | 60 ms | $10^{-6}$ | N/A | N/A | Mission Critical delay sensitive signaling such as MC-PTT signaling |
| 70 | | 55 | 200 ms | $10^{-6}$ | N/A | N/A | Mission Critical Data such as Sample service is the same as 5QI6/8/9 |
| 79 | | 65 | 50 ms | $10^{-2}$ | N/A | N/A | Messages (refer to TS 23.287 [121]) |
| 80 | | 68 | 10 ms | $10^{-6}$ | N/A | N/A | Low Latency eMBB applications Augmented Reality |
| 82 | GBR (Delay | 19 | 10 ms | $10^{-4}$ | 255 bytes | 2000 ms | Discrete Automation (refer to TS 22.261 [2]) |
| 83 | Critical GBR) | 22 | 10 ms | $10^{-4}$ | 1354 bytes | 2000 ms | Discrete Automation (refer to TS 22.261 [2]; V2X messages, UE-RSU Platooning, Advanced Driving: Cooperative Lane Switch with low LoA, refer to TS 22.186 [111], TS 23.287 [121] |
| 84 | | 24 | 30 ms | $10^{-5}$ | 1354 bytes | 2000 ms | Intelligent transport systems (refer to TS 22.261 [2]) |
| 85 | | 21 | 5 ms | $10^{-5}$ | 255 bytes | 2000 ms | Electricity Distribution-high voltage (refer to TS 22.261 [2]). V2X messages, Remote Driving, refer to TS 22.186 [111]. NOTE16, refer to TS 23.287 [121] |

TABLE 4-continued

| 5QI Value | Resource Type | Default Priority Level | Packet Delay Budget | Packet Error Rate | Default Maximum Data Burst Volume | Default Averaging Window | Example Services |
|---|---|---|---|---|---|---|---|
| 86 | | 18 | 5 ms | $10^{-4}$ | 1354 bytes | 2000 ms | V2X messages, Advanced Driving: Collision Avoidance, Platooning with high LoA, refer to TS 22.186 [111], TS 23.287 [121] |

In some embodiments, the method includes at least one of the following: receiving indication information that is sent by a serving base station and indicates the correspondence; or determining the correspondence based on an agreement of communication protocol.

Herein, the correspondence between service characteristic parameters and ranges of connection-waiting-duration scaling factors may be sent by the serving base station to the UE. The serving base station may send the correspondence to the UE by broadcasting. For example, the serving base station may carry and broadcast the indication information for indicating the correspondence in the system information. The UE determines the correspondence after receiving the system information.

The correspondence between service characteristic parameters and ranges of connection-waiting-duration scaling factors may be stipulated by the communication protocol, and the UE determines the correspondence based on the communication protocol. The correspondence between service characteristic parameters and ranges of connection-waiting-duration scaling factors may be negotiated by the serving base station and the UE, and the UE determines the connection-waiting-duration scaling factor based on the negotiated correspondence.

In some embodiments, determining the connection-waiting-duration scaling factor corresponding to the service characteristic parameter associated with the UE, based on the correspondence between service characteristic parameters and ranges of connection-waiting-duration scaling factors includes the following.

In response to at least two service characteristic parameters associated with the UE, the connection-waiting-duration scaling factor is determined from a range of connection-waiting-duration scaling factors having a smaller connection-waiting-duration scaling factor in at least two ranges of connection-waiting-duration scaling factors corresponding to the at least two service characteristic parameters associated with the UE.

The UE can usually perform data transmission of multiple services at the same time and the service characteristic parameters of the multiple services are different, or the service characteristic parameters of different data in one service are different. That is, there may be multiple current service characteristic parameters of the UE, and the multiple service characteristic parameters may respectively correspond to one range of connection-waiting-duration scaling factors.

Herein, the UE may determine from the range of connection-waiting-duration scaling factors with the smaller connection-waiting-duration scaling factor.

For example, the UE obtains the correspondence between ranges of service characteristic parameters and ranges of connection-waiting-duration scaling factors through system broadcast, in which the service characteristic parameter may be a PDB. If a sequence of PDB reference values is PDBminreference={PDBminreference_1, . . . , PDBminreference_n, . . . , PDBminreference_N}, where 0<PDBminreference_1<, . . . , <PDBminreference_n<, . . . , <PDBminreference_N. And the connection-waiting-duration scaling factor corresponding to each PDB is obtained and denoted as P={P_1, . . . , P_N}, where 0<P_1<, . . . , <P_n<, . . . , <P_N<1.

The UE can obtain the corresponding PDB according to the 5QI of all the uplink and downlink QoS Flows of the ongoing service, and obtain the minimum value PDBmin among the PDBs corresponding to all the QoS Flows. The range of connection-waiting-duration scaling factors, corresponding to the PDBmin, has a smaller connection-waiting-duration scaling factor. The UE may select the connection-waiting-duration scaling factor within the range of connection-waiting-duration scaling factors corresponding to the PDBmin.

If 0≤PDBmin≤PDBminreference_1, the UE may take a value in [0, P_1] as the connection-waiting-duration scaling factor.

If PDBminreference_n−1<PDBmin≤PDBminreference_n, the UE may take a value in (P_n−1, P_n] as the connection-waiting-duration scaling factor.

If PDBmin>PDUminreference_N, the UE can take a value in (P_n, 1] as the connection-waiting-duration scaling factor.

For another example, the UE obtains the correspondence between ranges of service characteristic parameters and ranges of connection-waiting-duration scaling factors through system broadcast, in which the service characteristic parameter may be Access Identity. When Access Identity=1, the connection-waiting-duration scaling factor∈[Pl_1, Pu_1], where 0≤Pl_1≤Pu_1≤1, when Access Identity=2, the connection-waiting-duration scaling factor∈[Pl_2, Pu_2], where 0≤When Pl_2≤Pu_2≤1, when Access Identity=11, 12, . . . , etc., the setting is the same as above.

If there are two Access Identities in the UE, they are 1 and 2 respectively. If Pl_1>Pl_2 and Pu_1>Pu_2, Pl_new=Pl_2, Pu_new=Pu_2, that is, the range of connection-waiting-duration scaling factors corresponding to this UE is [Pl_2, Pu_2].

The UE can take a value in [Pl_2, Pu_2] as the connection-waiting-duration scaling factor.

In some embodiments, determining the connection waiting duration for the UE to connect to the target base station based on the reference connection waiting duration and the connection-waiting-duration scaling factor associated with the UE includes the following.

A product of the reference connection waiting duration and the connection-waiting-duration scaling factor is determined as the connection waiting duration of the UE.

After determining the connection-waiting-duration scaling factor, the UE may multiply the reference connection waiting duration and the connection-waiting-duration scaling factor, and determine the multiplied product as the connection waiting duration.

For example, after the UE determines the range of connection-waiting-duration scaling factors, the UE generates a random number rand within the range of connection-waiting-duration scaling factors, and the random numbers may be uniformly distributed within the range of connection-waiting-duration scaling factors. The connection waiting duration corresponding to the UE is: rand*T0, where T0 is the reference connection waiting duration.

In some embodiments, the method includes: selecting randomly the connection-waiting-duration scaling factor, in which the connection-waiting-duration scaling factor does not exceed a preset range of duration scaling factors.

If the base station does not broadcast the correspondence between service characteristic parameters and ranges of connection-waiting-duration scaling factors, the UE may take a random number within the preset range of duration scaling factors as the connection-waiting-duration scaling factor.

Herein, the preset range of duration scaling factors may be preset. The preset range of duration scaling factors and the range of connection-waiting-duration scaling factors may be the same or different.

In some embodiments, in response to the reference connection waiting duration being a maximum value of the connection waiting duration, the connection-waiting-duration scaling factor does not exceed a range from 0 to 1.

Herein, the reference connection waiting duration may be the maximum value of the connection waiting duration, and for the reference connection waiting duration, the range of connection-waiting-duration scaling factors is: [0, 1].

In some embodiments, the method includes at least one of: receiving indication information that is sent by a serving base station and indicates the target base station; receiving indication information that is sent by the serving base station and indicates the reference connection waiting duration; or receiving indication information that is sent by the serving base station and indicates the predetermined connection moment.

Herein, the indication information for indicating the target base station, and/or the indication information for indicating the reference connection waiting duration, and/or the indication information for indicating the predetermined connection moment, may be sent by the serving base station to the UE. The serving base station may send the indication information for indicating the target base station, and/or the indication information for indicating the reference connection waiting duration, and/or the indication information for indicating the predetermined connection moment to the UE by broadcasting. For example, the serving base station may carry the indication information for indicating the target base station, and/or the indication information for indicating the reference connection waiting duration, and/or the indication information for indicating the predetermined connection moment in the system information and broadcast the system information.

Herein, the indication information for indicating the target base station may be a base station identifier of the target base station or the like.

The UE determines the target base station, the predetermined connection moment Te, and/or the reference connection waiting duration T0, etc. by receiving the indication information sent by the serving base station.

In some embodiments, connecting to the target base station based on the connection waiting duration after the predetermined connection moment includes at least one of: in response to the UE being in a connected state, connecting to the target base station after an interval of the connection waiting duration since the predetermined connection moment; or in response to the UE being in an idle state or an inactive state, and triggering a connection within a connection triggering time interval after the predetermined connection moment, connecting to the target base station after an interval of the connection waiting duration since triggering the connection.

The serving base station may indicate the time-based CHO mode to the UE. The serving base station may send the indication information, for indicating the target base station, the predetermined connection moment Te, and/or the reference connection waiting duration T0, and the like. The UE in the connected state determines the target base station, the predetermined connection moment Te, and/or the reference connection waiting duration T0, etc. by receiving the indication information sent by the serving base station. The predetermined connection moment Te may be the trigger moment of CHO. The UE may determine the connection waiting duration based on the reference connection waiting duration, and after the predetermined connection moment, continue to wait for the connection waiting duration and then connect to the target base station.

In this way, the UEs in the connected state connect to the target base station based on different connection waiting durations, reducing the number of UEs connected to the target base station at the same time and relieving the network congestion.

If the UE is in the idle state or inactive state at the predetermined connection moment, it can set the connection triggering time interval, which is after the predetermined connection moment. The connection triggering time interval can be the more frequently duration when each UE switches from the serving base station to the target base station. If the UE in the idle or inactive state triggers the connection to the base station within the connection triggering time interval, and if it needs to send a connection establishment request message, it can connect to the target base station after the connection waiting duration since triggering the connection to the base station. That is, when it is determined that the connection establishment request message needs to be sent, the connection establishment request message can be sent after the connection waiting duration.

In some embodiments, the method includes at least one of the following: receiving indication information that is sent by a network side and indicates the connection triggering time interval; or determining the connection triggering time interval based on an agreement of a communication protocol.

Herein, the base station may send the indication information for indicating the connection triggering time interval to the UE by means of broadcasting or the like. Herein, the base station may be the serving base station of the UE in the idle state or the inactive state when the UE is in the connected state, or may be the anchor base station of the UE in the idle state or the inactive state, or the like.

For example, the UE in the idle state obtains the connection triggering time interval Tx through network broadcast, where Tx may be less than or equal to the reference connection waiting duration T0. When the predetermined connection moment Te is reached, Tx is started. If the idle UE starts the transmission of the connection establishment request message before the Tx times out, the connection waiting duration T is started. When T times out, the UE sends the connection establishment request message to connect to the target base station.

The connection triggering time interval may also be specified by the communication protocol. The UE may determine the connection triggering time interval based on the communication protocol.

The connection triggering time interval may also be negotiated by the base station and the UE, and the UE determines the connection triggering time interval based on the negotiated result.

In this way, the UEs in the idle state or the inactive state connect to the target base station based on different connection waiting durations, reducing the number of UEs connected to the target base station at the same time and relieving the network congestion.

In some embodiments, the method includes: in response to the UE being in an idle state or an inactive state, and triggering a connection outside a connection triggering time interval after the predetermined connection moment, connecting to the target base station after triggering the connection.

The connection triggering time interval may be a time period during which each UE is frequently switched from the serving base station to the target base station. After the connection triggering time interval, the number of UEs changing from the serving base station to the target base station decreases, which is less likely to cause the network congestion. Therefore, if the UE in the idle state or the inactive state triggers the connection to the base station after the connection triggering time interval, it can directly establish the connection with the target base station. In this way, the waiting duration can be reduced and the connection timeliness of the target base station can be improved.

In some embodiments, the method includes: in response to the UE being in the connected state, synchronizing with the target base station at the predetermined connection moment.

In the process of establishing the connection between the UE and the target base station, such as the random-access process, the UE needs to complete synchronization with the target base station. The UE can synchronize with the target base station at the predetermined connection moment, so that the efficiency of establishing the RRC connection during the connection waiting duration can be improved.

For example, when the predetermined connection moment is reached, the UE may start a timer to time the connection waiting duration T, it may trigger the UE to synchronize with the cell of the target base station. When T times out, the UE initiates random access, RRC reconfiguration and other handover procedures.

Alternatively, when the predetermined connection moment is reached, the UE may start a timer to time the connection waiting duration T, and when T times out, it may trigger the UE to synchronize with the cell of the target base station, initiate random access, RRC reconfiguration and other handover procedures.

In some embodiments, in response to the UE being in the connected state, connecting to the target base station after the interval of the connection waiting duration since the predetermined connection moment includes: in response to the UE being in the connected state, switching to the target base station or initiating re-establishment to the target base station after the interval of the connection waiting duration since the predetermined connection moment.

Herein, connecting to the target base station may include switching to the target base station, or initiating re-establishment to the target base station.

In some embodiments, the method includes: receiving indication information that is sent by a serving base station and indicates to perform switching or indication information that is sent by the serving base station and indicates to perform re-establishment; switching to the target base station or initiating re-establishment to the target base station includes: switching to the target base station in response to receiving the indication information that indicates to perform switching; or initiating re-establishment to the target base station in response to receiving the indication information that indicates to perform re-establishment.

The serving base station may send the indication information to the UE, for indicating the UE to switch to the target cell or to perform re-establishment with the target cell. The serving base station may send the indication information by broadcasting.

For example, the serving base station uses broadcasting to indicate the UE to connect to the target base station in a switching manner. The UE finds the corresponding configuration in the CHO according to the identifier of the target base station of the serving base station, and subsequently triggers the switching. If the corresponding configuration in CHO is not found, re-establishment can be triggered.

If the serving base station uses broadcasting to indicate the UE to connect to the target base station by means of re-establishment, when the UE adopts the re-establishment manner, the UE initiates re-establishment to the target base station according to the identifier of the target base station broadcasted by the network.

Figure 6:
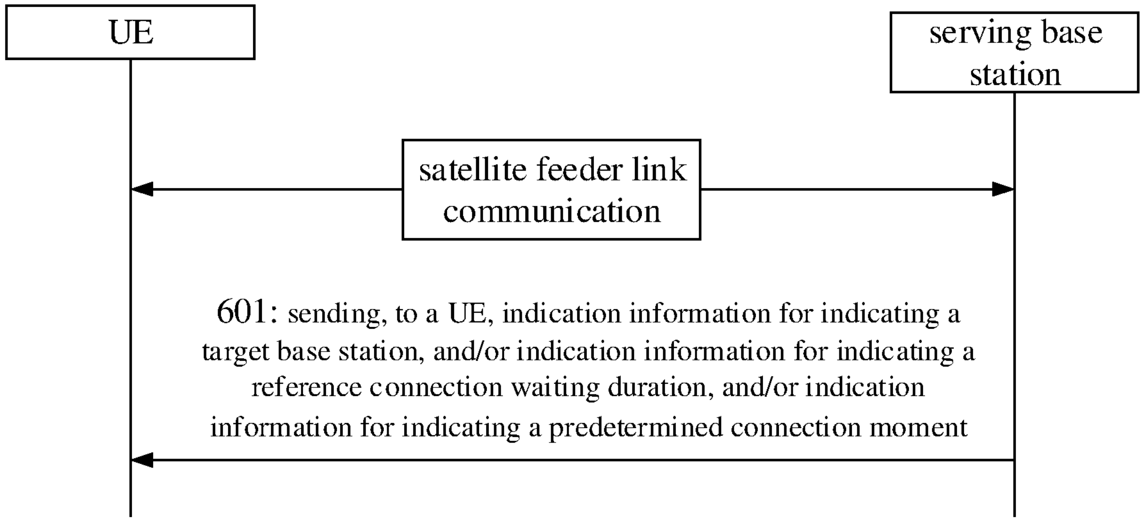
FIG. 6 is a schematic flowchart of another method for establishing a connection according to some embodiments.

As illustrated in FIG. 6, some embodiments provide a method for establishing a connection. The method for establishing a connection is applicable to a base station of wireless communication. The method includes the following.

Step 601: indication information for indicating a target base station, and/or indication information for indicating a reference connection waiting duration, and/or indication information for indicating a predetermined connection moment, is sent to a UE.

The reference connection waiting duration is used for the UE to determine in combination with a connection-waiting-duration scaling factor, a connection waiting duration for connecting to the target base station after the predetermined connection moment.

The UE may be a mobile phone terminal or the like that uses a cellular mobile communication network technology to perform wireless communication. The UE can establish a communication connection with the serving base station through the transparent forwarding of the feeder link between the high-altitude platform such as the satellite and the satellite ground station such as the GW. Herein the high-altitude platform is illustrated in Table 1.

In Table 1, except for GEO satellites, other high-altitude platforms usually have the feeder link switch. The method of embodiments of the disclosure can be used in, but not limited to, an NTN communication system where the feeder link switch occurs.

The following embodiments of the disclosure explain the method of embodiments of the disclosure by using the NTN communication system of the LEO satellite platform. However, it does not mean that the method in embodiments of the disclosure is only used in the NTN communication system of the LEO satellite platform.

As illustrated in FIG. 2, during the movement of the LEO satellite under transparent transmissions, the feeder link established with GW1 may switch to the feeder link established with GW2, in which GW1 is connected to base station 1 and GW2 is connected to the base station 2. That is, during the moving process of the LEO satellite, it may switch from base station 1 to base station 2. Herein, the base station may be a gNB in the 5G cellular mobile communication.

The target base station is a base station that the UE switches from the current serving base station during the movement of the LEO satellite. For example, as illustrated in FIG. 2, at the moment T1, gNB1 is connected to the UE through GW1 and the LEO satellite, and gNB1 is the serving base station of the UE. During the movement of the LEO satellite, that is, from the moment T1 to the moment T2, the base station connected to the UE is switched from gNB1 to gNB2 and gNB2 is the target base station.

The reference connection waiting duration can be a fixed duration. The reference connection waiting duration may be specified by a communication protocol or determined by a core network or base station based on the number of UEs covered by LEO satellite signals and/or the number of UEs that need to be connected to the target base station.

The connection-waiting-duration scaling factor can be used to adjust the connection waiting duration of the UE based on the reference connection waiting duration. The connection-waiting-duration scaling factor is associated with the UE and different UEs may have different connection-waiting-duration scaling factors. Herein, the connection-waiting-duration scaling factor may be associated with a UE type or may be associated with a current service characteristic of the UE or the like.

Based on the reference connection waiting duration and the connection-waiting-duration scaling factor associated with the UE, the connection waiting duration of each UE can be obtained. Due to different connection-waiting-duration scaling factors, the connection waiting duration of each UE is also different. For example, a product of the reference connection waiting duration and the connection-waiting-duration scaling factor or a quotient of dividing the reference connection waiting duration and the connection-waiting-duration scaling factor can be determined as the connection waiting duration. When the division manner is adopted to determine the connection waiting duration, the connection-waiting-duration scaling factor is not 0. Herein, the connection-waiting-duration scaling factor may be a non-negative number less than or equal to 1 or a positive number greater than 1.

The predetermined connection moment may be a moment indicated by the serving base station to start to switch to the target base station, or may be a moment when the satellite establishes a connection with the target base station, or the like. As illustrated in FIG. 2, the predetermined connection moment may be the moment T2. The UE may connect to the target base station based on the predetermined connection moment and the connection waiting duration. For example, the target base station may be connected to after an interval of the connection waiting duration since the predetermined connection moment. Since the connection waiting duration of each UE is different, the moment at which each UE connects to the target base station is also different. In this way, the number of UEs connected to the target base station at the same time is reduced and the network congestion is relieved.

In this way, after the predetermined connection moment, the target base station is connected based on the connection waiting duration associated with each UE, the number of UEs connected to the target base station at the same time is reduced, and the network congestion is relieved.

Herein, the indication information for indicating the target base station, and/or the indication information for indicating the reference connection waiting duration, and/or the indication information for indicating the predetermined connection moment, may be sent by the serving base station to the UE. The serving base station may send the indication information for indicating the target base station, and/or the indication information for indicating the reference connection waiting duration, and/or the indication information for indicating the predetermined connection moment to the UE by broadcasting. For example, the serving base station may carry the indication information for indicating the target base station, and/or the indication information for indicating the reference connection waiting duration, and/or the indication information for indicating the predetermined connection moment in the system information and broadcast the system information.

Herein, the indication information for indicating the target base station may be a base station identifier of the target base station or the like.

The UE determines the target base station, the predetermined connection moment Te, and/or the reference connection waiting duration T0, etc. by receiving the indication information sent by the serving base station.

Figure 7:
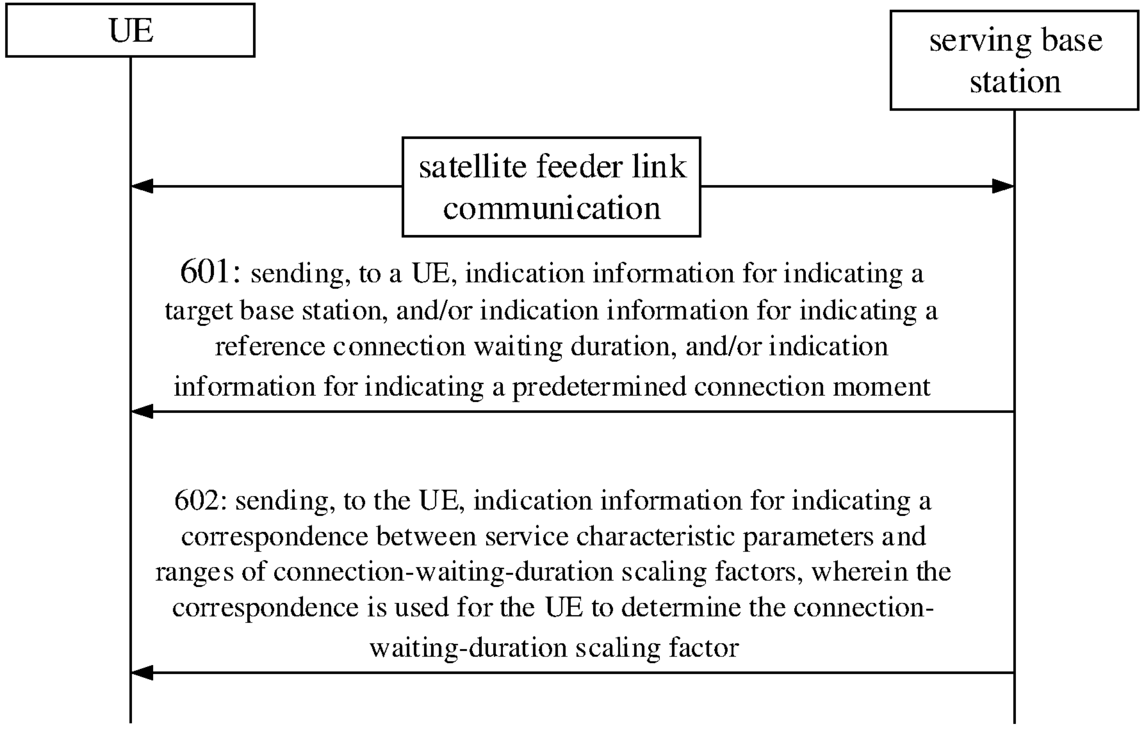
FIG. 7 is a schematic flowchart of yet another method for establishing a connection according to some embodiments.

In some embodiments, as illustrated in FIG. 7, the method includes the following.

Step 602: indication information for indicating a correspondence between service characteristic parameters and ranges of connection-waiting-duration scaling factors is sent to the UE, in which the correspondence is used for the UE to determine the connection-waiting-duration scaling factor.

Herein, the correspondence between service characteristic parameters and ranges of connection-waiting-duration scaling factors may be sent by the serving base station to the UE. The serving base station may send the correspondence to the UE by broadcasting. For example, the serving base station may carry and broadcast the indication information for indicating the correspondence in the system information. The UE determines the correspondence after receiving the system information.

The UE may randomly select a value from the determined range of connection-waiting-duration scaling factors as its connection-waiting-duration scaling factor.

For example, the UE may generate a random number rand within the range of connection-waiting-duration scaling factors, and the random number may be uniformly distributed within the range of connection-waiting-duration scaling factors. Based on the randomly generated connection-waiting-duration scaling factor and by combining the reference connection waiting duration, the connection waiting duration is determined.

In this way, by randomly selecting a value within the range of connection-waiting-duration scaling factors, the situation where the value is the same is reduced and the situation where the connection waiting duration is the same is reduced. The UEs connects to the target base station based on different connection waiting durations, reducing the number of UEs connected to the target base station at the same time and relieving the network congestion.

In some embodiments, the correspondence between service characteristic parameters and ranges of connection-waiting-duration scaling factors includes: a correspondence between ranges of service characteristic parameters and ranges of connection-waiting-duration scaling factors.

Since there are a large number of possible values for the service characteristic parameter, the correspondence between ranges of service characteristic parameters and ranges of connection-waiting-duration scaling factors is established. The available values of the service characteristic parameter can be divided into multiple different ranges, and each range of service characteristic parameters corresponds to a range of connection-waiting-duration scaling factors. The ranges of connection-waiting-duration scaling factors corresponding to different ranges of service feature parameters may be the same or different.

The UE may determine the connection-waiting-duration scaling factor based on the correspondence between ranges of service characteristic parameters and ranges of connection-waiting-duration scaling factors.

For example, the service characteristic parameter may be a packet delay budget (PDB). All PDBs may be divided into N ranges, where N is a positive integer greater than or equal to 1. Each PDB range corresponds to a range of connection-waiting-duration scaling factors. The UE may select the PDB range corresponding to its own PDB, and then determine the corresponding range of connection-waiting-duration scaling factors.

For example, a sequence of PDBs is $PDBreference=\{PDBreference\_1, \ldots, PDBreference\_n, \ldots, PDBreference\_N\}$, where $0<PDBreference\_1<, \ldots, <PDBreference\_n<, \ldots, <PDBreference\_N$. And the connection-waiting-duration scaling factor corresponding to each PDB is obtained and denoted as a sequence including connection-waiting-duration scaling factors as $P=\{P\_1, \ldots, P\_N\}$, where $0<P\_1<, \ldots, <P\_n<, \ldots, <P\_N<1$.

The UE obtains the PDB corresponding to the QoS flow according to the 5QI of the ongoing service.

If $0 \leq PDB \leq PDBreference\_1$, the UE may determine the connection-waiting-duration scaling factor within the range $[0, P\_1]$ of connection-waiting-duration scaling factors. If $PDBminreference\_n-1<PDBmin \leq PDBminreference\_n$, the UE may determine the connection-waiting-duration scaling factor within the range $(P\_n-1, P\_n)$ of connection-waiting-duration scaling factors.

If $PDBmin>PDUminreference\_N$, the UE may determine the connection-waiting-duration scaling factor within the range $(P\_n, 1]$ of connection-waiting-duration scaling factors.

In some embodiments, the method includes: sending indication information for indicating to perform switching or indication information for indicating to re-establishment to the UE.

Herein, connecting to the target base station may include switching to the target base station, or initiating re-establishment to the target base station.

The serving base station may send the indication information to the UE, for indicating the UE to switch to the target cell or to perform re-establishment with the target cell. The serving base station may send the indication information by broadcasting.

For example, the serving base station uses broadcasting to indicate the UE to connect to the target base station in a switching manner. The UE finds the corresponding configuration in the CHO according to the identifier of the target base station of the serving base station, and subsequently triggers the switching. If the corresponding configuration in CHO is not found, re-establishment can be triggered.

If the serving base station uses broadcasting to indicate the UE to connect to the target base station by means of re-establishment, when the UE adopts the re-establishment manner, the UE initiates re-establishment to the target base station according to the identifier of the target base station broadcasted by the network.

In some embodiments, the method includes: sending indication information for indicating a connection triggering time interval to the UE.

If the UE is in the idle state or inactive state at the predetermined connection moment, it can set the connection triggering time interval, which is after the predetermined connection moment. The connection triggering time interval can be the more frequently duration when each UE switches from the serving base station to the target base station. If the UE in the idle or inactive state triggers the connection to the base station within the connection triggering time interval, and if it needs to send a connection establishment request message, it can connect to the target base station after the connection waiting duration since triggering the connection to the base station. That is, when it is determined that the connection establishment request message needs to be sent, the connection establishment request message can be sent after the connection waiting duration.

Herein, the serving base station may send the indication information for indicating the connection triggering time interval to the UE by means of broadcasting or the like.

For example, the UE in the idle state obtains the connection triggering time interval Tx through network broadcast, where Tx may be less than or equal to the reference connection waiting duration T0. When the predetermined connection moment Te is reached, Tx is started. If the idle UE starts the transmission of the connection establishment request message before the Tx times out, the connection waiting duration T is started. When T times out, the UE sends the connection establishment request message to connect to the target base station.

In this way, the UEs in the idle state or the inactive state connect to the target base station based on different connection waiting durations, reducing the number of UEs connected to the target base station at the same time and relieving the network congestion.

An example is provided below in conjunction with any of the above-mentioned embodiments.

Complete content of the technical solutions provided by embodiments of the disclosure includes the following.

1, The UE obtains the indication information of the target base station through system broadcasting, such as the target gNB identity, the predetermined connection moment Te, and the reference connection waiting duration such as the longest waiting duration T0.

2, The network configures the correspondence between service characteristic parameters and connection-waiting-duration scaling factors. The UE selects the connection-waiting-duration scaling factor according to its own service characteristic parameter. The service characteristic parameter can be indicated through Access Identity, Access Category, 5QI, QoS characteristic parameter, etc.

3, If the network does not broadcast the correspondence between connection-waiting-duration scaling factors and service characteristic parameters, the UE generates a random number between 0 and 1 as the connection-waiting-duration scaling factor.

4, The UE scales T0 to obtain the connection waiting duration timer T, and the connection-waiting-duration scaling factor is determined by 2 and 3.

5, The network may indicate the UE in the connected state to perform re-establishment or switching by broadcasting.

6, When the UE adopts the switching, the UE finds the corresponding configuration in the CHO according to the gNB identity broadcasted by the network, and subsequently triggers the switching. If the corresponding configuration in the CHO is not found, re-establishment is triggered subsequently.

7, When the UE adopts re-establishment, the UE initiates re-establishment to the target gNB according to the gNB identity broadcasted by the network.

8, When the moment Te is reached, T is started, and when T times out, the switching or re-establishment process is triggered.

9, Based on 8, the UE can synchronize with the target cell when the moment Te arrives.

10, The UE in the idle state obtains the timer duration Tx through network broadcast.

11, When the moment Te is reached, the UE in the idle state starts Tx. If the transmission of the connection establishment request message is started before Tx times out, T is started. When T times out, the UE sends the connection establishment request message.

Example 1

1, The UE obtains the indication information of the target base station through system broadcasting, such as the target gNB identity, the predetermined connection moment Te, and the reference connection waiting duration such as the longest waiting duration T0.

2, The UE obtains the correspondence between connection-waiting-duration scaling factors and service characteristic parameters PDBs through system broadcasting: a sequence of PDBs is set as PDBminreference= {PDBminreference_1, . . . , PDBminreference_n, . . . , PDBminreference_N}, where 0<PDBminreference_1<, . . . , <PDBminreference_n<, . . . , <PDBminreference_N. And the connection-waiting-duration scaling factor corresponding to each PDB is obtained and the sequence including connection-waiting-duration scaling factors is recorded as P={P_1, . . . , P_N}, where 0<P_1<, . . . , <P_n<, . . . , <P_N<1.

3, The UE obtains the corresponding PDBs according to the 5QIs of all uplink and downlink QoS flows of the ongoing service, and obtains the minimum value PDBmin among the PDBs corresponding to all the QoS flows.

4, T is determined based on the minimum value PDBmin:

4.1, If 0≤PDBmin≤PDBminreference_1, the UE generates a random number rand, and the random number is evenly distributed in the range [0, P_1], and then duration T corresponding to the UE is: rand*T0.

4.2, If PDBminreference_n−1<PDBmin≤PDBminreference_n, the UE generates a random number rand, and the random number is evenly distributed in the range (P_n−1, P_n), and then duration T corresponding to the UE is: rand*T0.

4.3, If PDBmin>PDUminreference_N, the UE generates a random number rand, and the random number is evenly distributed in the range (P_n, 1], and then duration T corresponding to the UE is: rand*T0.

5, The network indicates the UE in the connected state to adopt switching according to the broadcast, and the UE finds the corresponding configuration in the CHO according to the gNB identity broadcasted by the network, and subsequently triggers the switching.

6, When the moment Te is reached, 6.1, Start T. When T times out, the UE is triggered to synchronize with the target cell, initiates random access and switching procedures such as RRC reconfiguration.

Or, 6.2, the UE synchronizes with the target cell and starts T. When T times out, it initiates random access, RRC reconfiguration and other switching procedures.

Example 2

1, The UE obtains the indication information of the target base station through system broadcasting, such as the target gNB identity, the predetermined connection moment Te, and the reference connection waiting duration such as the longest waiting duration T0.

2, The UE obtains the correspondence between connection-waiting-duration scaling factors and service characteristic parameters Access Identities through system broadcasting. When Access Identity=1, the connection-waiting-duration scaling factor∈[Pl_1, Pu_1], where 0≤Pl_1≤Pu_1≤1, when Access Identity=2, the connection-waiting-duration scaling factor∈[Pl_2, Pu_2], where 0≤Pl_2≤Pu_2≤1, when Access Identity=11, 12, . . . , etc., the setting is the same as above.

3, If there are two Access Identities in the UE, they are 1 and 2 respectively. If Pl_1>Pl_2 and Pu_1>Pu_2, Pl_new=Pl_2, Pu_new=Pu_2, that is, the range of connection-waiting-duration scaling factors corresponding to this UE is [Pl_2, Pu_2].

4, The UE generates a random number rand, and the random number is evenly distributed in the range [Pl_2, Pu_2], and duration T corresponding to the UE is: rand*T0.

5, The network indicates the UE in the connected state to adopt switching according to the broadcast, and the UE finds the corresponding configuration in the CHO according to the gNB identity broadcasted by the network, and subsequently triggers the switching.

6, When the moment Te is reached, 6.1, Start T. When T times out, the UE is triggered to synchronize with the target cell, initiates random access and switching procedures such as RRC reconfiguration.

Or, 6.2, the UE synchronizes with the target cell and starts T. When T times out, it initiates random access, RRC reconfiguration and other switching procedures.

Figure 8:
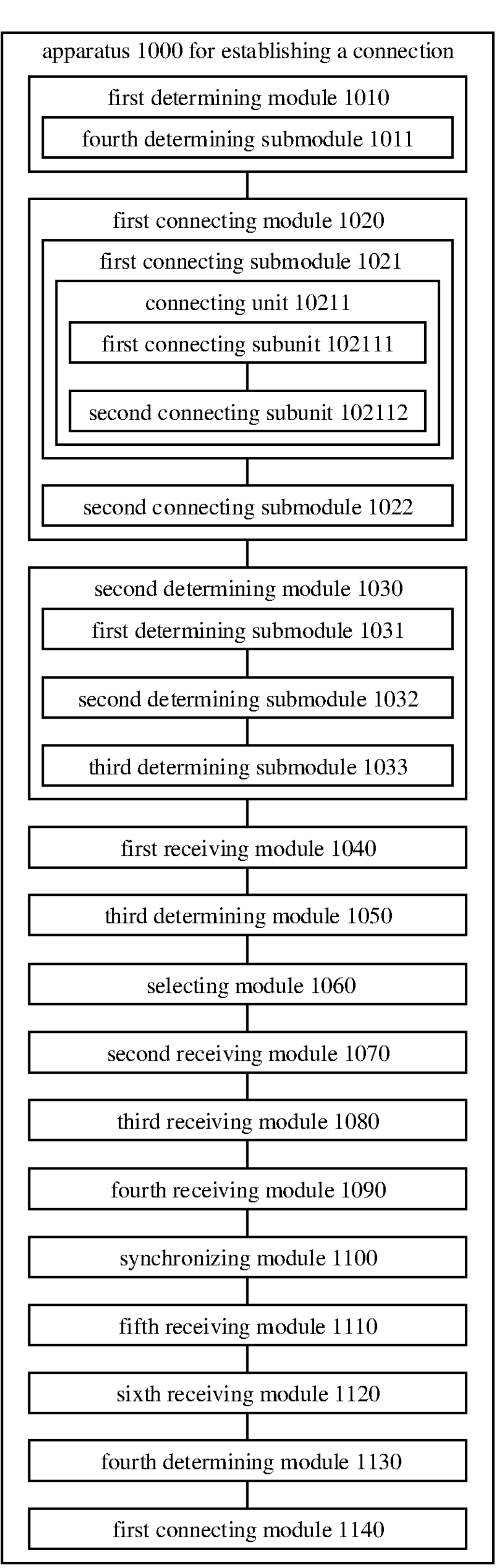
FIG. 8 is a block diagram of an apparatus for establishing a connection according to some embodiments.

Some embodiments of the disclosure further provide an apparatus for establishing a connection. The apparatus is applicable to a UE. As illustrated in FIG. 8, the apparatus 1000 for establishing a connection includes a first determining module 1010 and a first connecting module 1020.

The first determining module 1010 is configured to determine a connection waiting duration for the UE to connect to a target base station based on a reference connection waiting duration and a connection-waiting-duration scaling factor associated with the UE.

The first connecting module 1020 is configured to connect to the target base station based on the connection waiting duration after a predetermined connection moment.

In some embodiments, the apparatus 1000 includes: a second determining module 1030 configured to determine the connection-waiting-duration scaling factor corresponding to a service characteristic parameter associated with the UE, based on a correspondence between service characteristic parameters and ranges of connection-waiting-duration scaling factors.

In some embodiments, the correspondence between service characteristic parameters and ranges of connection-waiting-duration scaling factors includes: a correspondence between ranges of service characteristic parameters and ranges of connection-waiting-duration scaling factors.

In some embodiments, the second determining module 1030 includes: a first determining submodule 1031 configured to determine the connection-waiting-duration scaling factor from a range of connection-waiting-duration scaling factors corresponding to a range of service characteristic parameters to which the service characteristic parameter associated with the UE belongs.

In some embodiments, the second determining module 1030 includes: a second determining submodule 1032 configured to select randomly the connection-waiting-duration scaling factor from a range of connection-waiting-duration scaling factors corresponding to the service characteristic parameter associated with the UE.

In some embodiments, the service characteristic parameter includes: an access identity, and/or an access category, and/or a fifth-generation quality of service identity (5QI), and/or a quality of service (QoS) characteristics parameter.

In some embodiments, the apparatus 1000 includes: a first receiving module 1040 configured to receive indication information that is sent by a serving base station and indicates the correspondence; or a third determining module 1050 configured to determine the correspondence based on an agreement of a communication protocol.

In some embodiments, the second determining module 1030 includes: a third determining submodule 1033 configured to, in response to at least two service characteristic parameters associated with the UE, determine the connection-waiting-duration scaling factor from a range of connection-waiting-duration scaling factors having a smaller connection-waiting-duration scaling factor in at least two ranges of connection-waiting-duration scaling factors corresponding to the at least two service characteristic parameters associated with the UE.

In some embodiments, the first determining module 1010 includes: a fourth determining submodule 1011 configured to determine a product of the reference connection waiting duration and the connection-waiting-duration scaling factor as the connection waiting duration of the UE.

In some embodiments, the apparatus 1000 includes: a selecting module 1060 configured to select randomly the connection-waiting-duration scaling factor, in which the connection-waiting-duration scaling factor does not exceed a preset range of duration scaling factors.

In some embodiments, in response to the reference connection waiting duration being a maximum value of the connection waiting duration, the connection-waiting-duration scaling factor does not exceed a range from 0 to 1.

In some embodiments, the apparatus 1000 includes at least one of: a second receiving module 1070 configured to receive indication information that is sent by a serving base station and indicates the target base station; a third receiving module 1080 configured to receive indication information that is sent by the serving base station and indicates the reference connection waiting duration; or a fourth receiving module 1090 configured to receive indication information that is sent by the serving base station and indicates the predetermined connection moment.

In some embodiments, the first connecting module 1020 includes at least one of: a first connecting submodule 1021 configured to, in response to the UE being in a connected state, connect to the target base station after an interval of the connection waiting duration since the predetermined connection moment; or a second connecting submodule 1022 configured to, in response to the UE being in an idle state or an inactive state, and triggering a connection within a connection triggering time interval after the predetermined connection moment, connect to the target base station after an interval of the connection waiting duration since triggering the connection.

In some embodiments, the apparatus 1000 includes: a synchronizing module 1100 configured to, in response to the UE being in the connected state, synchronize with the target base station at the predetermined connection moment.

In some embodiments, the first connecting submodule 1021 includes: a connecting unit 10211 configured to, in response to the UE being in the connected state, switch to the target base station or initiate re-establishment to the target base station after the interval of the connection waiting duration since the predetermined connection moment.

In some embodiments, the apparatus 1000 includes: a fifth receiving module 1110 configured to receive indication information that is sent by a serving base station and indicates to perform switching or indication information that is sent by the serving base station and indicates to perform re-establishment; the connecting unit 10211 includes: a first connecting subunit 102111 configured to switch to the target base station in response to receiving the indication information that indicates to perform switching; or a second connecting subunit 102112 configured to initiate re-establishment to the target base station in response to receiving the indication information that indicates to perform re-establishment.

In some embodiments, the apparatus 1000 includes at least one of: a sixth receiving module 1120 configured to receive indication information that is sent by a network side and indicates the connection triggering time interval; or a fourth determining module 1130 configured to determine the connection triggering time interval based on an agreement of a communication protocol.

In some embodiments, the apparatus 1000 includes: a first connecting module 1140 configured to, in response to the UE being in the idle state or the inactive state, and triggering the connection outside the connection triggering time interval after the predetermined connection moment, connect to the target base station after triggering the connection.

Figures 9, 10:
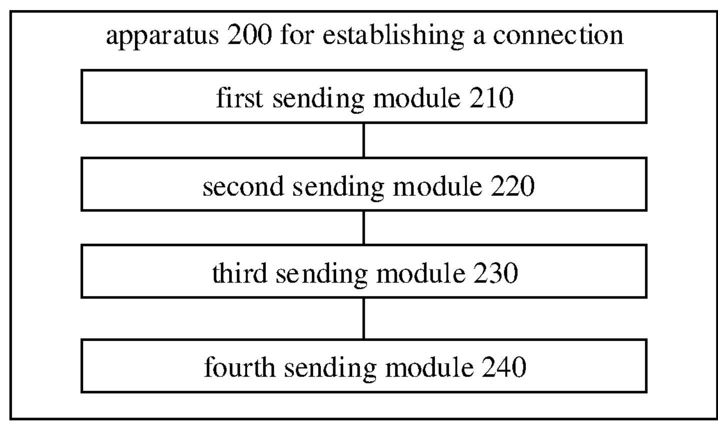
FIG. 9 is a block diagram of another apparatus for establishing a connection according to some embodiments.
FIG. 10 is a block diagram of a device for establishing a connection according to some embodiments.

Some embodiments of the disclosure further provide an apparatus for establishing a connection. The apparatus is applicable to a base station. As illustrated in FIG. 9, the apparatus 200 for establishing a connection includes a first sending module 210.

The first sending module 210 is configured to send, to a UE, indication information for indicating a target base station, and/or indication information for indicating a reference connection waiting duration, and/or indication information for indicating a predetermined connection moment; in which the reference connection waiting duration is used for the UE to determine in combination with a connection-waiting-duration scaling factor, a connection waiting duration for connecting to the target base station after the predetermined connection moment.

In some embodiments, the apparatus 200 includes: a second sending module 220 configured to send, to the UE, indication information for indicating a correspondence between service characteristic parameters and ranges of connection-waiting-duration scaling factors, in which the correspondence is used for the UE to determine the connection-waiting-duration scaling factor.

In some embodiments, the correspondence between service characteristic parameters and ranges of connection-waiting-duration scaling factors includes: a correspondence between ranges of service characteristic parameters and ranges of connection-waiting-duration scaling factors.

In some embodiments, the apparatus 200 includes: a third sending module 230 configured to send, to the UE, indication information for indicating to perform switching or indication information for indicating to re-establishment.

In some embodiments, the apparatus 200 includes: a fourth sending module 240 configured to send, to the UE, indication information for indicating a connection triggering time interval.

In some embodiments, the first determining module 1010, the first connecting module 1020, the second determining module 1030, the first receiving module 1040, the third determining module 1050, the selecting module 1060, the second receiving module 1070, the third receiving module 1080, the fourth receiving module 1090, the synchronizing module 1100, the fifth receiving module 1110, the sixth receiving module 1120, the fourth determining module 1130, the first connecting module 1140, the first sending module 210, the second sending module 220, the third sending module 230, the fourth sending module 240, and the like can be configured by one or more of: central processing units (CPUs), graphics processing unit (GPUs), baseband processors (BPs), application specific integrated circuits (ASICs), DSPs, programmable logic devices (PLDs), complex programmable logic devices (CPLDs), field programmable gate arrays (FPGAs), general purpose processors, controllers, micro controller units (MCUs), microprocessors or other electronic components to perform the foregoing methods.

FIG. 10 is a block diagram of a device 3000 for establishing a connection according to some embodiments. For example, the device 3000 may be a mobile phone, a computer, a digital broadcast terminal, a messaging device, a gaming console, a tablet, a medical device, exercise equipment, a personal digital assistant, and the like.

Referring to FIG. 10, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to perform all or part of the steps in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the device 3000. Examples of such data include instructions for any disclosures or methods operated on the device 3000, contact data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and the rear camera may receive an external multimedia datum while the device 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone ("MIC") configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a CMOS or CCD image sensor, for use in imaging disclosures. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as WiFi, 2G, or 3G, or a combination thereof. In one exemplary embodiment, the communication component 3016 receives a broadcast signal or broadcast associated information from an external broadcast management system via a broadcast channel. In one exemplary embodiment, the communication component 3016 includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 3000 may be implemented with one or more disclosure specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 3004, executable by the processor 3020 in the device 3000, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for establishing a connection, performed by a user equipment (UE), the method comprising:

receiving indication information that is sent by a Non-Terrestrial Networks (NTN) serving base station, wherein the indication information is configured to indicate a reference connection waiting duration and a predetermined connection moment, and the indication information is used for a time-triggered conditional hand over (CHO); and connecting to a target base station or target cell based on a connection waiting duration after a predetermined connection moment; wherein the connection waiting duration is a product of the reference connection waiting duration and a factor, and a value of the factor is a positive number greater than 1.

2. A non-transitory computer-readable storage medium having stored therein instructions that, when executed by a processor of a communication device, cause the communication device to perform the method of claim 1.

3. The method of claim 1, further comprising:

determining the factor corresponding to a service characteristic parameter associated with the UE, based on a correspondence between service characteristic parameters and ranges of factors.

4. The method of claim 3, wherein the correspondence between service characteristic parameters and ranges of factors comprises:

a correspondence between ranges of service characteristic parameters and ranges of factors.

5. The method of claim 3, wherein determining the factor corresponding to the service characteristic parameter associated with the UE, based on the correspondence between service characteristic parameters and ranges of factors comprises at least one of:

determining the factor from a range of factors corresponding to a range of service characteristic parameters to which the service characteristic parameter associated with the UE belongs;

selecting randomly the factor from a range of factors corresponding to the service characteristic parameter associated with the UE; or in response to at least two service characteristic parameters associated with the UE, determining the factor from a range of actors having a smaller factor in at least two ranges of factors corresponding to the at least two service characteristic parameters associated with the UE.

6. The method of claim 3, wherein the service characteristic parameter comprises: an access identity, and/or an access category, and/or a fifth-generation quality of service identity 5QI, and/or a quality of service QoS characteristics parameter.

7. A method for establishing a connection, performed by a base station, the method comprising:

sending, to a user equipment (UE), indication information for indicating a target base station, wherein the indication information is configured to indicate a reference connection waiting duration and a predetermined connection moment, and the indication information is used for a time-triggered conditional hand over (CHO);

wherein the indication information is used for the UE to connect to the target base station based on a connection waiting duration after the predetermined connection moment;

wherein the predetermined connection moment is used for triggering the CHO, the connection waiting duration is a product of the reference connection waiting duration and a factor, a value of the factor is a positive number greater than 1.

8. A communication device, comprising:

a processor, and a memory storing a program executable by the processor, wherein the processor is configured to perform the method of claim 7.

9. A non-transitory computer-readable storage medium having stored therein instructions that, when executed by a processor of a communication device, cause the communication device to perform the method of claim 7.

10. The method of claim 7, further comprising:

sending, to the UE, indication information for indicating a correspondence between service characteristic parameters and ranges of factors, wherein the correspondence is used for the UE to determine the factor.

11. A communication device, comprising:

a processor, and a memory storing a program executable by the processor, wherein the processor is configured to:

receive indication information that is sent by a Non-Terrestrial Networks (NTN) serving base station, wherein the indication information is configured to indicate a reference connection waiting duration and a predetermined connection moment, and the indication information is used for a time-triggered conditional hand over (CHO); and connect to a target base station or target cell based on a connection waiting duration after a predetermined connection moment, wherein the connection waiting duration is a product of the reference connection waiting duration and a factor, and a value of the factor is a positive number greater than 1.

12. The communication device of claim 11, wherein the processor is further configured to:

determine the factor corresponding to a service characteristic parameter associated with a user equipment (UE), based on a correspondence between service characteristic parameters and ranges of factors.

13. The communication device of claim 12, wherein the correspondence between service characteristic parameters and ranges of factors comprises:

a correspondence between ranges of service characteristic parameters and ranges of factors.

14. The communication device of claim 12, wherein in determining the factor corresponding to the service characteristic parameter associated with the UE, based on the correspondence between service characteristic parameters and ranges of factors, the processor is further configured to perform at least one of:

determining the factor from a range of factors corresponding to a range of service characteristic parameters to which the service characteristic parameter associated with the UE belongs;

selecting randomly the factor from a range of factors corresponding to the service characteristic parameter associated with the UE; or in response to at least two service characteristic parameters associated with the UE, determining the factor from a range of actors having a smaller factor in at least two ranges of factors corresponding to the at least two service characteristic parameters associated with the UE.

* * * * *